United States Patent

Bozzay et al.

Patent Number: 6,043,918
Date of Patent: Mar. 28, 2000

[54] LASER SATELLITE COMMUNICATION SYSTEMS

[75] Inventors: Joseph McAlpin Bozzay, Leesburg, Va.; Richard C. Thuss, Holland, Pa.; James Howard Leveque, III, Reston; Thomas A. Russell, Arlington, both of Va.

[73] Assignee: Stanford Telecommunications, Inc., Reston, Va.

[21] Appl. No.: 08/989,467

[22] Filed: Dec. 12, 1997

[51] Int. Cl.[7] .................................................. H04B 10/00
[52] U.S. Cl. ............................................ 359/172; 359/152
[58] Field of Search .................................. 359/172, 152, 359/143, 159; 455/427

[56] References Cited

U.S. PATENT DOCUMENTS

| | | | |
|---|---|---|---|
| 4,491,982 | 1/1985 | Candy et al. | 359/172 |
| 4,928,317 | 5/1990 | Franchini | 359/172 |
| 5,119,225 | 6/1992 | Grant et al. | 359/172 |
| 5,218,467 | 6/1993 | Ross et al. | 359/172 |
| 5,661,582 | 8/1997 | Kintis et al. | 359/172 |
| 5,710,652 | 1/1998 | Bloom et al. | 359/152 |

OTHER PUBLICATIONS

Shikatani et al., "ETS–VI Experimental Optical Inter–Satellite Communication System", Conference Paper, Jun. 11–14, 1989, pp. 1600–1604.

Primary Examiner—Kinfe-Michael Negash
Attorney, Agent, or Firm—Jim Zegeer

[57] ABSTRACT

A laser satellite communication system which avoids atmospheric, wind and turbulence effects. A satellite or high altitude platform communication system includes an earth-orbiting satellite or high altitude platform carrying a laser communications receiver and an acknowledgement transmitter. A ground terminal having a laser communications transmitter which is caused to continuously transmit large data block signals. When one block of data signals is received at the satellite or platform, an acknowledgement signal is sent to earth from the satellite or platform. The ground terminal receives the acknowledgement signal and causes the ground terminal laser communication transmitter to continuously transmit the next succeeding large block data signals. This process is repeated until all of the data has been received by the earth-orbiting satellite or high altitude platform, whereby all of the large data block signals are received by the laser communication receiver through scintillation windows in the atmosphere.

3 Claims, 2 Drawing Sheets

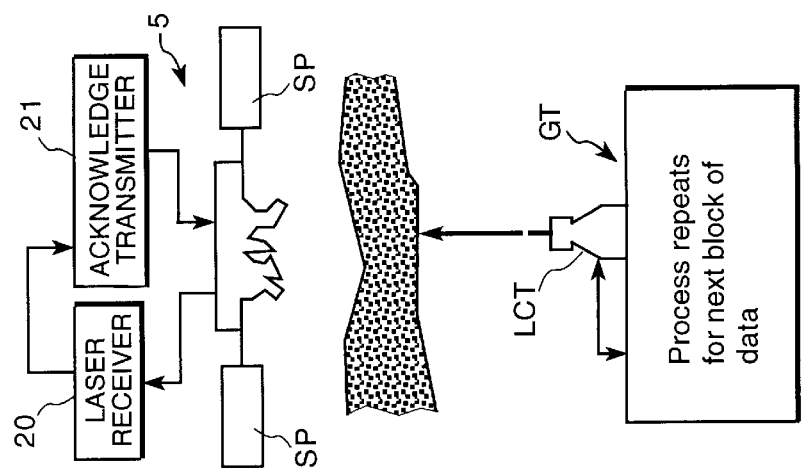
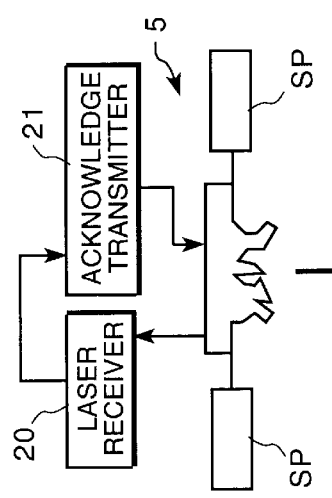
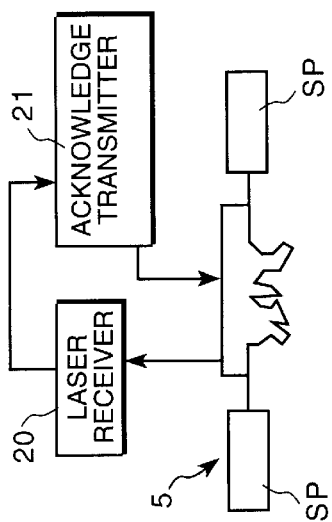

LASER SATELLITE COMMUNICATION SYSTEMS

BACKGROUND AND BRIEF DESCRIPTION OF THE INVENTION

FIGS. 1A and 1B diagrammatically illustrate the key problems in ground-based laser communications with satellites and high altitude platforms. Clouds and moisture in the atmosphere scatter the laser beam energy, resulting in lost communications. Wind-borne turbulence refracts, distorts and corrupts the beam, making it difficult for laser communications. There is technology which exists that permits transmission and reception of laser signals. Approaches to communications between the ground source and space or satellite and high altitude platforms that have been postulated require adaptive optics and special signal compensation to allow for communications.

The object of the present invention is to provide a laser communication system for communication between the earth and earth-orbiting satellites or high altitude platforms that does not depend on adaptive optics or special signal compensation to allow laser communications between the ground and the space receiver.

The invention is predicated on the discovery that scintillation "windows", which occur about fifty percent of the time for up to 10 milliseconds, can be used to provide laser communications with a satellite. The present invention is based on the concept of causing a ground-based laser communications transmitter to continuously repeat large data block signals aimed at an earth-orbiting satellite or high altitude platforms and providing a laser communications receiver and acknowledgement transmitter on the earth-orbiting satellites or platform. During the scintillation windows, packetized portions of the large data block signals are received through the window, and on receipt of the packets at the satellite or high altitude platform, an acknowledgement transmitter mounted on the earth-orbiting satellite or platform transmits an acknowledgement signal causing the ground terminal laser communication transmitter to again continuously repeatedly transmit the next succeeding large block data signals and repeating this process until all the data has been received by the earth-orbiting satellite or high altitude platform. Thus, high data rate communication is achieved between space or high altitude platforms and ground terminals using laser communications through the scintillation windows in the atmosphere.

Thus, the limitations on high data rate communications between high altitude space and ground terminals, namely, (1) the atmospheric limitations on coherent bandwidth and (2) frequency use due to international treaties and U.S. government regulations are avoided. These limitations restrict present user bandwidth to a few gigabits in the radio frequency spectrum.

Research and development activities in the use of laser communications have the potential to support several hundred gigabits of communications but are fundamentally limited by atmospheric turbulence, clouds, rainfall and impose extreme stability requirements on both the satellite and the ground terminals. Normal atmospheric conditions create very high loss signal fade so as to cause large signal losses such that long duration communications is not feasible without significant compensation. However, the present invention breaks the data stream into short packets which will fit entirely in the gaps between deep scintillation fades. These packets will be retransmitted multiple times until there is high probability of passing through the gaps defined by the scintillation windows. As noted above, scintillation produces gains in received signal strength about fifty percent of the time and fades about fifty percent of the time. The received signal strength fluctuates randomly up and down with an average period of several milliseconds. The packet length will be somewhat less on the order of tenths of milliseconds. The very high data rates possible with laser communication will yield useful data rates even after reduction due to the required retransmission. As this invention does not require multiple apertures or compensation to mitigate scintillation, it is an affordable solution that still provides the inherent advantages of laser communications. These advantages include small terminals, low probability of interference, and low probability of interception.

BRIEF DESCRIPTION OF THE DRAWINGS

The above and other objects, advantages and features of the invention will become more apparent when considered in conjunction with the following specification and accompanying drawings wherein:

FIG. 2 is a diagrammatic illustration of a ground terminal which transmits continuously repeating large data blocks encoded and encrypted through the atmosphere and scintillation windows to an earth-orbiting satellite or a high altitude atmospheric platform, FIG. 3 is a diagrammatic illustration of the earth-orbiting satellite transmitting an acknowledgement of the received signal to the ground terminal, and FIG. 4 is a diagrammatic depiction of the repeating of the process for the next block of data.

DETAILED DESCRIPTION OF THE INVENTION

Figures 1A, 1B:
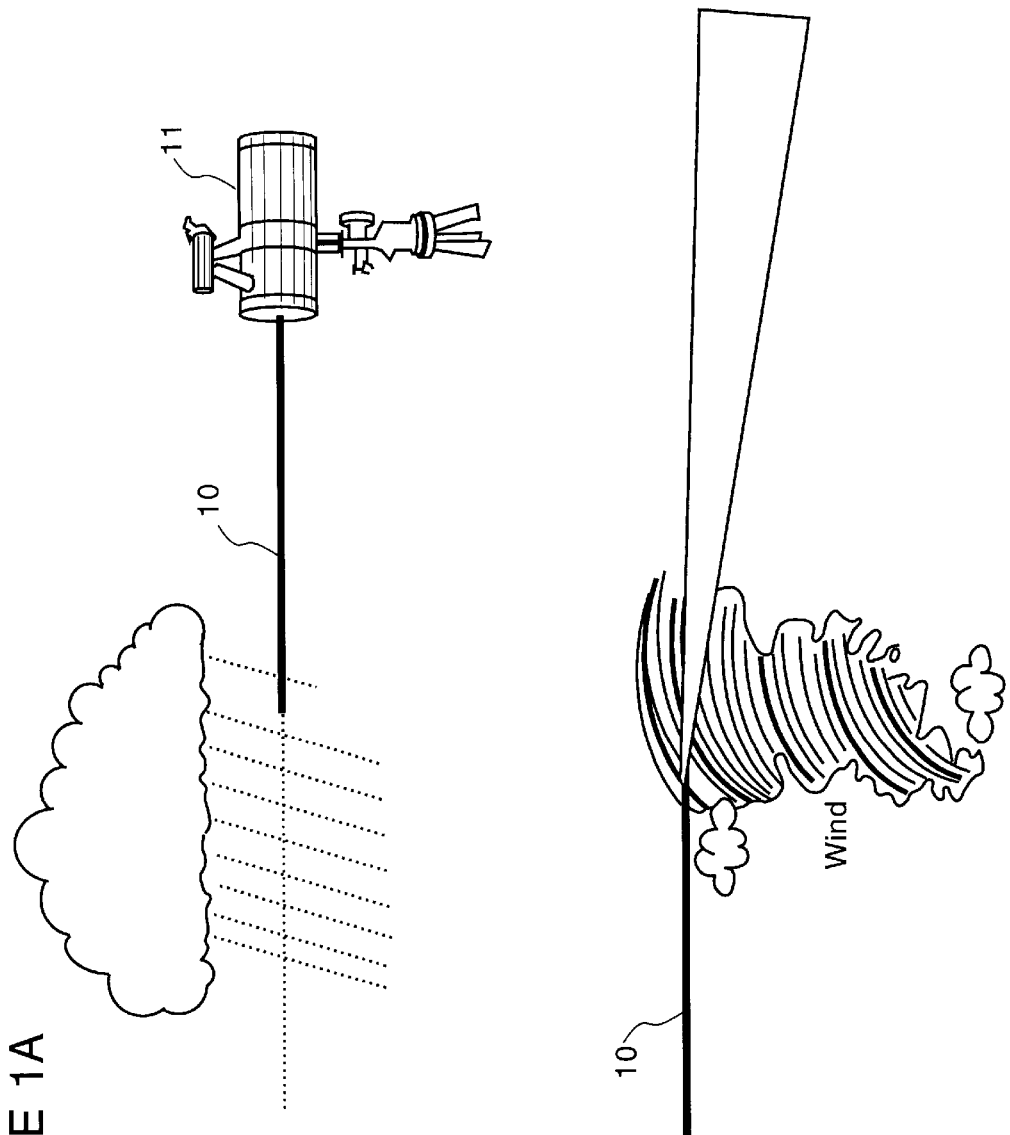
FIGS. 1A and 1B are diagrammatic depictions or illustrations of the key problems in laser communications from earth to space or high altitude platforms and vice versa.

As illustrated and depicted in FIG. 1A, clouds and moisture and other atmospheric conditions can scatter laser beam energy 10 from a laser transmitter 11. In a somewhat different phenomena, the laser beam 10 from laser communications transmitter 11 is refracted and distorted by wind-borne turbulence to corrupt the beam, making it difficult for communications using laser technology. Thus, high data rate communications between space and/or high altitude platforms and ground terminals are limited by these atmospheric limitations.

These limitations restrict the present usable bandwidth to a few gigabits and the radio frequency spectrum. It is well known that if laser communications are possible between earth and earth-orbiting satellites and/or high altitude platforms, then the lasers have potential to support several hundred gigabits of communications. A few of the limitations discussed above, normal atmospheric conditions create very high loss signal fades so as to cause large signal losses such that long duration communication is not feasible without significant compensation. We have discovered that laser communications using scintillation windows which occur about fifty percent of the time for up to 10 milliseconds is possible and that this laser communication can be achieved using small terminals with low probability of interference and low probability of interception.

Referring now to FIG. 2, a satellite S is shown as having solar panels SP and is equipped with a laser communication receiver 20 and an acknowledgement transmitter 21 which is preferably an RF transmitter. A ground terminal GT having a laser communications transmitter LCT which includes means for causing the ground terminal laser communication transmitter LCT to transmit continuously repeating large data blocks which are encoded and encrypted towards the atmosphere. According to the invention, the data stream is broken up into short packets which will fit entirely in the gaps between the deep scintillation fades. The laser communications transmitter LCT causes these packets to be retransmitted multiple times until there is a high probability of their passing through the gaps or scintillation windows. Scintillation produces gain in received signal strength about fifty percent of the time and fades about fifty percent of the time. The received signal strength thus fluctuates randomly up and down with an average period of several milliseconds. The packet length will be somewhat less, on the order of tenths of milliseconds. The very high data rates possible with laser communications will still yield useful data rates even after reduction for transmission. As depicted in FIG. 3, the satellite or platform terminal S receives data in gaps between scintillation fades typically of the order of 0.2 to 10 milliseconds. When the laser communications receiver 20 on the satellite or high altitude platform S receives the data block signals, it actuates acknowledgement transmitter 21, which is preferably a conventional radio transmitter, to transmit an acknowledgement of receipt of signal to the ground terminal GT. As depicted in FIG. 4, the process repeats itself for the next succeeding blocks of data.

It will be appreciated that the acknowledgement signal from the satellite or platform can be of any frequency band. Moreover, while the acknowledgement signal is preferred, it will be appreciated that in a less preferred embodiment the system could operate without the acknowledged signal if required.

The advantages of the system include that it is a low-cost high-data rate communication uplink system and that it operates at low power, low probability of detection with anti-jam qualities for a laser communication system. Thus, there has been provided a simple ground terminal with intermittent communications providing high burst data rates at relatively low ground cost terminal equipment.

While the invention has been described in connection with the preferred embodiment, it will be appreciated that various other embodiments, adaptations and modifications of the invention will be readily apparent to those skilled in the art.

What is claimed is:

1. A laser/optical communication system using an earth-orbiting satellite or a high altitude platform with a laser communication receiver and an acknowledgement transmitter mounted on said earth-orbiting satellite or platform, a ground terminal having a laser communications transceiver receiving a data stream, means for causing said ground terminal laser communications transceiver to break up said data stream into short packets of data signals which will fit entirely in the gaps between scintillation fades in the atmosphere and retransmitting said short packets of data signals multiple times, means on said earth-orbiting satellite or high altitude platform to transmit an acknowledgement signal to the ground terminal on receipt of said short packets of data signals, and means at said ground terminal for receiving said acknowledgement signal and causing said ground terminal laser communication transceiver to continuously transmit the next succeeding packet of data signals and repeating this process until all of the data has been received by said earth-orbiting satellite or high altitude platform, whereby all of said data stream is received by said laser communication receiver through scintillation windows in the atmosphere.

2. A communication system having an earth-orbiting satellite or a high altitude platform and a laser communication receiver carried on said earth-orbiting satellite or high altitude platform, a ground terminal having a laser communications transmitter adapted to receive a data stream and break up said data stream into short packets of data signals which will fit entirely in the gaps between scintillation fades in the atmosphere, means for causing said ground terminal laser communications transmitter to transmit continuously repeating data block signals, and means for causing said laser communication transmitter to continuously transmit the next succeeding of said packet of data signals and repeating this process until all of the data has been received by said earth-orbiting satellite or high altitude platform, whereby all of said short packets of data signals are received by said laser communication receiver through scintillation windows in the atmosphere.

3. A laser/optical communication method for communicating between an earth-based ground terminal and an earth-orbiting satellite or high altitude platform, comprising:

providing a laser communication receiver and acknowledgement transmitter on said earth-orbiting satellite or platform, providing a ground terminal having a laser communications transceiver for receiving a data stream and causing said ground terminal laser communication transceiver to break up said data stream into short packets of data signals which will fit entirely in the gaps between scintillation fades in the earth's atmosphere and retransmitting said short packets of data signals multiple times, causing said acknowledgement transmitter mounted on said earth-orbiting satellite or platform to transmit an acknowledgement signal to said ground terminal on receipt of said short packets of data signals, and at said ground terminal providing means for receiving said acknowledgement signal and causing said ground terminal laser communication receiver to continuously transmit the next succeeding packet of data signals and repeating this process until all of the data has been received by said earth-orbiting satellite or high altitude platform via scintillation windows in the atmosphere.

* * * * *